United States Patent [19] [11] 3,859,365
Young [45] Jan. 7, 1975

[54] PRODUCTION OF ALKYL-SUBSTITUTED PHENOLS FROM CYCLOHEXENONES

[75] Inventor: David A. Young, Church Hill, Tenn.

[73] Assignee: Eastman Kodak Company, Rochester, N.Y.

[22] Filed: July 19, 1973

[21] Appl. No.: 380,919

[52] U.S. Cl. ......... 260/621 H, 260/620, 260/624 R, 260/625
[51] Int. Cl. ............................................ C07c 37/06
[58] Field of Search ............ 260/620, 621 R, 624 R, 260/621 H

[56] References Cited
UNITED STATES PATENTS 3,385,902  5/1968  Bright et al. .................... 260/621 R
3,641,166  2/1972  Rühl et al. ...................... 260/621 R

*Primary Examiner*—Leon Zitver
*Assistant Examiner*—Norman P. Morgenstern
*Attorney, Agent, or Firm*—Elliott Stern; Daniel B. Reece, III

[57] ABSTRACT

Alkyl-substituted phenols, particularly 3,4,5- and 2,3,6-trimethylphenols, are prepared by heating a suitable alkyl-substituted 2-cyclohexen-1-one in the presence of oxygen, a catalytic amount of cupric chloride, from 0.01 to 2.0 moles of hydrochloric acid and a water compatible organic solvent at a temperature of from 20 to 200°C. The phenols are especially useful as germicidal materials, for conversion into soil insecticidal materials and as intermediates for the synthesis of trimethylhydroquinone.

7 Claims, No Drawings

PRODUCTION OF ALKYL-SUBSTITUTED PHENOLS FROM CYCLOHEXENONES

This invention relates to a process for the production of alkyl-substituted phenols from substituted 2-cyclohexen-1-ones.

F. M. Beringer and E. J. Geering, J. Am. Chem. Soc., 75, 2633 (1953), demonstrate a number of methods of obtaining 2,3,5- and 3,4,5-trimethylphenol from isophorone. Their most successful method comprised brominating isophorone in 1,2,4-trichlorobenzene (B.P. 213°C.) and refluxing the resulting solution until the evolution of hydrogen bromide ceased to obtain a 44–47 percent yield of a mixture of 2,3,5-trimethylphenol and 3,4,5-trimethylphenol in a ratio of about 1:3. Similarly, chlorination gave only 4 percent of these phenols. E. M. Kosower and G. S. Wu, J. Org. Chem., 28, 633 (1963), have heated isophorone with copper (II) chloride in the presence of lithium chloride and dimethylformamide to obtain equal quantities of 3-chloromethyl-5,5-dimethyl-2-cyclohexen-1-one and 6-chloro-3,5,5-trimethyl-2-cyclohexen-1-one together with about 10 percent of a mixture of phenols comprising 6-chloro-2,3,5-trimethylphenol; 2,3,5-trimethylphenol; and 2-chloro-3,4,5-trimethylphenol. W. von Doering and F. M. Beringer, J. Am. Chem. Soc., 71, 2221 (1949), disclose that treatment of isophorone with a large excess of 30 percent oleum at ambient temperature for ten days followed by exhaustive steam distillation results in the formation of 3,4,5-trimethylphenol in 54 percent yield. U.S. Pat. No. 3,385,903 discloses a method of producing trimethylphenols by heating 2-chloroisophorone with an aqueous mineral acid solution at autogeneous pressure. This process has the disadvantage of being carried out in closed vessels at elevated pressures. It is readily apparent that an economical and commercially feasible route to alkyl-substituted phenols in increased yields would be highly desirable.

A commercially feasible process has now been found for the production of high yields of alkyl-substituted phenols having the general formula

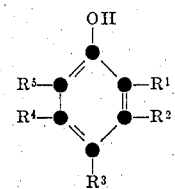

which comprises reacting an alkyl substituted 2-cyclohexen-1-one having the formula

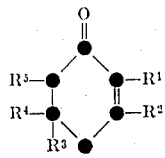

wherein $R^1$–$R^5$ are hydrogen, lower alkyl, e.g., methyl, ethyl, propyl, butyl, hexyl, etc., or phenyl, at least one of $R^1$–$R^5$ being a lower alkyl group, in the presence of oxygen, a catalytic amount of cupric chloride, from 0.01 to 2.0 moles of hydrochloric acid and a water compatible organic solvent at a temperature of from 20°C. to 200°C.

The alkyl substituted phenols of this invention, therefore, may be obtained in a one-step synthesis from readily available reactants. For example, isophorone is easily obtained to produce 3,4,5-trimethylphenol. The reaction is catalytic in cupric chloride and hydrochloric acid, uses air as an oxidant, and can be carried out at atmospheric pressure. The use of halogen gas is avoided, and the product may easily be separated from the reaction solution and catalyst. In addition, a relatively high concentration of reactant may be used.

Examples of suitable 2-cyclohexen-1-ones useful in the process of this invention are 3,5,5-trimethyl-2-cyclohexen-1-one (isophorone), 2,3,6-trimethyl-2-cyclohexen-1-one, 2,5,6-trimethyl-2-cyclohexen-1-one, etc. These compounds may be obtained commercially or produced by well-known methods. For example, see Dutch Pat. No. 6,903,484. A preferred starting material is isophorone which will result in the production of high yield of 3,4,5-trimethylphenol.

The process of this invention is carried out in the presence of oxygen and a catalytic amount of cupric chloride, preferably from 1 to 50 weight percent based on the weight of the reactants. The catalyst is admixed with from 0.01 to 2 moles of hydrochloric acid and water compatible organic solvent, preferably with 5 to 80 weight percent. Suitable water compatible organic solvents are two to four carbon atom monocarboxylic acids, for instance, alkanoic acids such as acetic acid, two to eight carbon atom alcohols, for instance, alkanols such as isopropyl alcohol and ethanol, acetone, dimethylformamide and various chlorinated solvents, the only requirement being that the solvent be able to dissolve the catalyst and reactants and be compatible with water. The preferred solvent is acetic acid. The reaction temperatures under which the process of this invention may be carried out vary from about 20° to about 200°C. Preferably, the reaction will be carried out at a temperature of from about 60° to about 100°C. The reaction may be carried out at atmospheric pressure.

The compounds prepared by the process of this invention have utility as intermediates in various organic syntheses. For example, U.S. Pat. No. 3,130,122 discloses the preparation of 3,4,5-trimethylphenyl methyl carbamate by reacting 3,4,5-trimethylphenol with methyl isocyanate in the presence of a catalytic amount of a catalyst such as a tertiary aliphatic amine; the patent indicates that this carbamate is an effective insecticide for controlling soil-dwelling insect pests. Also, 2,3,6-trimethyl phenol may be oxidized to trimethyl hydroquinone, a useful intermediate for the synthesis of Vitamin E.

This invention will be further illustrated by the following examples although it will be understood that these examples are included merely for purposes of illustration and are not intended to limit the scope of the invention.

EXAMPLE 1

Isophorone (414.6 g.) is added over a period of 1 hour to a solution of cupric chloride dihydrate (105.0 g.) and 12N hydrochloric acid (100 ml.) dissolved in acetic acid (500 ml.) and water (250 ml.) at 81°. The solution is stirred rapidly while air is admitted at 1.5 l./min. The reaction is continued for an additional 2.5 hours whereupon the solution is chilled. A mass of crystalline 3,4,5-trimethyl phenol separates. This is filtered off, washed with n-hexane, recrystallized from acetone/hexane and air dried giving 137.9 g. The mother liquor is then worked up. Concentration of the $CH_2Cl_2$ solution and dilution with hexane give 106.9 g. of 3,4,5- trimethyl phenol. Distillation of the mother liquor at reduced pressures gives an additional 51.8 g. The combined product is then dried. The total yield is 293.7 g. or 72.1 percent. This material is then recrystallized from CH$_2$Cl$_2$/hexane giving 256.6 g. or 63 percent yield of pure product.

EXAMPLE 2

In a manner similar to Example 1, 2,3,6-trimethyl-2-cyclohexen-1-one and 2,5,6-trimethyl-2-cyclohexen-1-one, respectively, are reacted with a catalytic amount of cupric halide and hydrochloric acid in acetic acid solvent using air as a source of oxygen. Good yields of 2,3,6-trimethyl phenol are obtained in each case.

The invention has been described in detail with particular reference to preferred embodiments thereof, but it will be understood that variations and modifications can be effected within the spirit and scope of the invention.

I claim:
1. Process for producing alkyl substituted phenols having the general formula

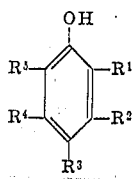

which comprises reacting an alkyl substituted 2-cyclohexen-1-one having the formula

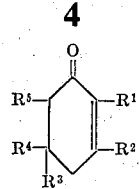

wherein R$^1$–R$^5$ are hydrogen, lower alkyl or phenyl, at least one of R$^1$–R$^5$ being a lower alkyl group, in the presence of oxygen, a catalytic amount of cupric chloride, from 0.01 to 2.0 moles of hydrochloric acid and a water compatible organic solvent selected from the group consisting of two and four carbon atom alkanoic acids, two to eight carbon atom alkanols, acetone and dimethylformamide, at a temperature of from 20°C. to 200°C.

2. The process of claim 1 wherein R$^1$–R$^5$ are hydrogen or methyl.

3. The process of claim 2 wherein the alkyl-substituted 2-cyclohexen-1-one is 3,5,5-trimethyl-2-cyclohexen-1-one.

4. The process of claim 2 wherein the alkyl-substituted 2-cyclohexen-1-one is 2,3,6-trimethyl-2-cyclohexen-1-one.

5. The process of claim 2 wherein the alkyl-substituted 2-cyclohexen-1-one is 2,5,6-trimethyl-2-cyclohexen-1-one.

6. The process of claim 1 wherein the organic solvent is acetic acid.

7. The process of claim 6 wherein R$^1$–R$^5$ are hydrogen or methyl.

* * * * *